US012761866B2

(12) United States Patent
Chiang

(10) Patent No.: US 12,761,866 B2
(45) Date of Patent: Oct. 13, 2026

(54) DISPLAY DEVICE AND AUDIO CONTROL METHOD THEREOF

(71) Applicant: BENQ CORPORATION, Taipei City (TW)

(72) Inventor: Chin-Fu Chiang, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 288 days.

(21) Appl. No.: 18/800,233

(22) Filed: Aug. 12, 2024

(65) Prior Publication Data

US 2025/0123796 A1 Apr. 17, 2025

(30) Foreign Application Priority Data

Oct. 11, 2023 (TW) ................................ 112138713

(51) Int. Cl.

| | |
|---|---|
| ***G06F 3/16*** | (2006.01) |
| ***G06F 3/04847*** | (2022.01) |
| ***G06F 13/38*** | (2006.01) |
| ***G06F 13/42*** | (2006.01) |

(52) U.S. Cl.

CPC .......... *G06F 3/165* (2013.01); *G06F 3/04847* (2013.01); *G06F 3/162* (2013.01); *G06F 13/382* (2013.01); *G06F 13/4282* (2013.01); *G06F 2213/0042* (2013.01)

(58) Field of Classification Search

CPC ....... G06F 3/165; H04R 3/12; H04R 2430/01; H03G 5/02

See application file for complete search history.

(56) References Cited

U.S. PATENT DOCUMENTS

| | | | | |
|---|---|---|---|---|
| 9,529,565 B2 * | 12/2016 | Bae | .......................... | H04N 5/60 |
| 10,013,381 B2 * | 7/2018 | Mayman | .................. | H04R 3/12 |
| 12,273,084 B2 * | 4/2025 | Dizon | ...................... | H03G 1/02 |
| 2011/0167465 A1 | 7/2011 | Higuchi et al. | | |
| 2015/0293744 A1 | 10/2015 | Bae et al. | | |

FOREIGN PATENT DOCUMENTS

| | | |
|---|---|---|
| CN | 102739864 A | 10/2012 |
| EP | 3367673 B1 | 6/2021 |
| WO | 2022025606 A1 | 2/2022 |

OTHER PUBLICATIONS

Office action of counterpart application by EPO on Apr. 17, 2026.
Office action of counterpart application by EPO on Feb. 10, 2025.

* cited by examiner

*Primary Examiner* — Disler Paul

(57) ABSTRACT

A display device capable of providing a first audio, which is coupled to a host device through a first interface, performs the following operations. A first output volume value of the display device is adjusted according to a first control command, and the first output volume value is compared with an upper limit value or a lower limit value to generate a first comparison result. The first audio is generated according to the first output volume value and a second output volume value of the host device. When the first control command indicates increasing or decreasing the first output volume value, and the first 10 comparison result indicates that the first output volume value is equal to the upper limit value or the lower limit value, a second control command is sent to the host device through the first interface to adjust the second output volume value.

22 Claims, 6 Drawing Sheets

DISPLAY DEVICE AND AUDIO CONTROL METHOD THEREOF

This application claims the benefit of Taiwan application Serial No. 112138713, filed Oct. 11, 2023, the disclosure of which is incorporated by reference herein in its entirety.

TECHNICAL FIELD

The present disclosure relates to an electronic device and a control method thereof, and in particular relates to a display device capable of providing audio and an audio control method thereof.

BACKGROUND

With the progress of electronic technology, various display devices have been widely used in daily life, such as flat-panel displays, smart TVs, etc. Most display devices are provided with built-in speakers, or the display device may be coupled to external speakers or external headphones to provide output audio.

The display device may adjust a volume value of the output audio. The volume adjustment mechanism includes: adjusting an output volume value of the display device itself, and adjusting a system output volume value of the host device which is coupled to the display device. The volume value of the output audio is proportional to a product of the output volume value of the display device itself and the system output volume value.

A User often directly adjusts the output volume value of the display device itself, but less likely adjusts the system output volume value of the host device. In order to improve user's convenience, an improved volume control mechanism is needed such that the user may further adjust the system output volume value of the host device when adjusting the output volume value of the display device itself.

SUMMARY

According to an example of the present disclosure, a display device is disclosed. The display device is capable of providing a first audio and coupled to a host device through a first interface. The display device has a first output volume value, and the host device has a second output volume value. The display device comprises the following elements. A main control element, used to adjust the first output volume value according to a first control command, and compare the first output volume value with an upper limit value or a lower limit value to generate a first comparison result. An output element, coupled to the main control element and the host device, and used to generate the first audio according to the first output volume value and the second output volume value. An interface control element, coupled to the main control element and an input element, coupled to the host device through the first interface, and used to selectively generate a second control command according to the first comparison result and the first control command. When the first control command indicates increasing the first output volume value and the first comparison result indicates that the first output volume value is equal to the upper limit value, or when the first control command indicates decreasing the first output volume value and the first comparison result indicates that the first output volume value is equal to the lower limit value, the interface control element generates the second control command and sends the second control command to the host device through the first interface, and the host device adjusts the second output volume value in response to the second control command.

According to another example of the present disclosure, an audio control method is disclosed. The audio control method is for controlling a first audio provided by a display device. The display device is coupled to a host device through a first interface, the display device has a first output volume value, and the host device has a second output volume value. The audio control method comprising the following steps. Adjusting the first output volume value according to a first control command. Generating the first audio according to the first output volume value and the second output volume value. Comparing the first output volume value with an upper limit value or a lower limit value to generate a first comparison result. Selectively generating a second control command according to the first comparison result and the first control command. When the first control command indicates increasing the first output volume value and the first comparison result indicates that the first output volume value is equal to the upper limit value, or when the first control command indicates decreasing the first output volume value and the first comparison result indicates that the first output volume value is equal to the lower limit value, performing the following steps. Generating the second control command. Sending the second control command to the host device through the first interface. Adjusting the second output volume value by the host device in response to the second control command.

Figure 1:
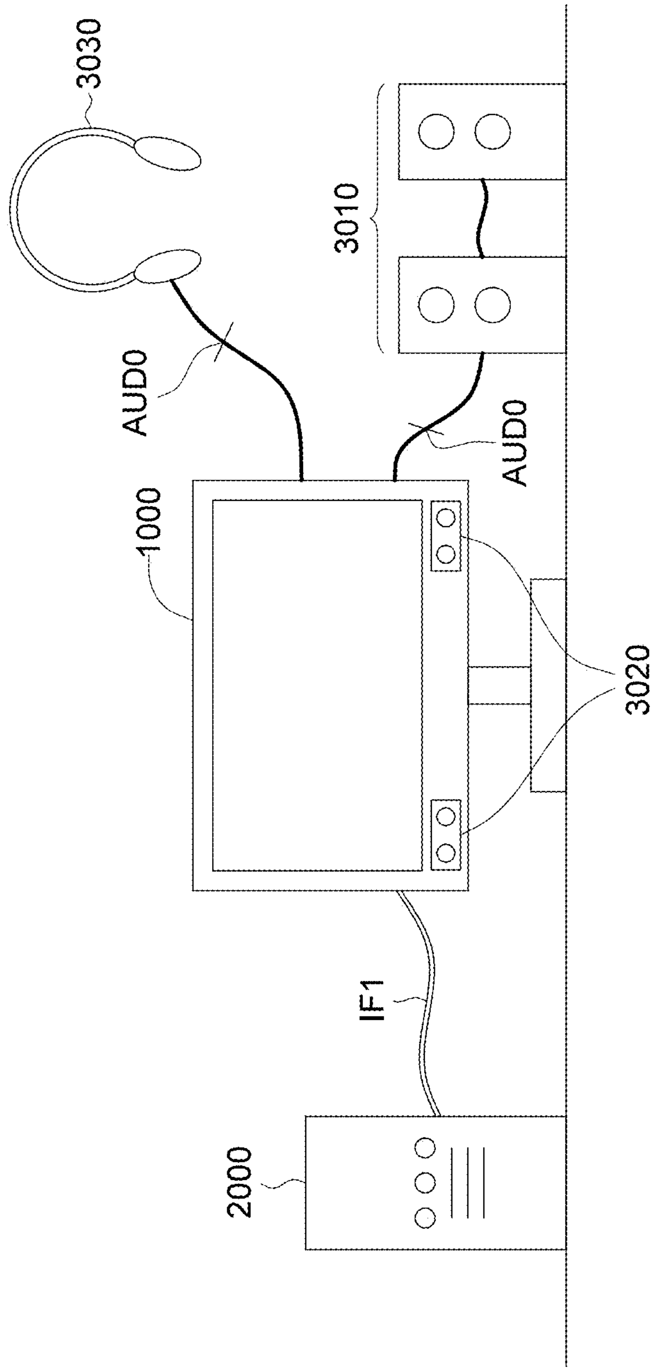
FIG. 1 is a schematic diagram of a display device 1000 according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which is a schematic diagram of a display device 1000 according to an embodiment of the present disclosure. The display device 1000 is coupled to the host device 2000 through the first interface IF1. The display device 1000 is, e.g., an external monitor, the host device 2000 is, e.g., a host of a desktop computer, and the first interface IF1 is, e.g., a Universal Serial Bus (USB) interface, a High Definition Multimedia Interface (HDMI) or Display Port (DP) interface between the display device 1000 and the host device 2000. FIG. 1 simply shows the first interface IF1 in the form of a connection line. Those skilled in this art should understand that the first interface IF1 may include connectors and/or connection lines of the USB interface, the HDMI or the DP interface.

The display device 1000 may provide the first audio AUD0. The first audio AUD0 may be converted into a sound through speakers or headphones and provided to a user. The speaker is, e.g., an external speaker 3010 externally connected to the display device 1000 or a built-in speaker 3020 internally disposed in the display device 1000. The headphone is, e.g., an external headphone 3030 externally connected to the display device 1000.

The display device 1000 has a first output volume value VOL1, and the first output volume value VOL1 indicates a volume value controlled by the display device 1000 itself. Furthermore, the host device 2000 has a second output volume value VOL2, and the second output volume value VOL2 indicates a system volume value of the host device 2000. A volume value VOL0 of the first audio AUD0 is proportional to a product of the first output volume value VOL1 and the second output volume value VOL2. In this embodiment, the volume value VOL0 of the first audio AUD0 is equal to the product of the first output volume value VOL1 and the second output volume value VOL2.

The display device 1000 may adjust the first output volume value VOL1 through the first control command CM1, thereby adjusting the volume value VOL0 of the first audio AUD0. For example, when the first output volume value VOL1 increases, the volume value VOL0 of the first audio AUD0 increases accordingly. When the first output volume value VOL1 increases to an upper limit value VOL1_max and cannot continue to increase, the second output volume value VOL2 may be further increased such that the volume value VOL0 of the first audio AUD0 may continue to increase.

On the other hand, when the first output volume value VOL1 decreases, the volume value VOL0 of the first audio AUD0 also decreases. When the first output volume value VOL1 decreases to the lower limit value VOL1_min and cannot continue to decrease, the second output volume value VOL2 may be further decreased such that the volume value VOL0 of the first audio AUD0 may continue to decrease.

The display device 1000 may send the second control command CM2 to the host device 2000 through the first interface IF1, and control the host device 2000 to adjust the second output volume value VOL2 through the second control command CM2. In this embodiment, only when the first output volume value VOL1 increases to the upper limit value VOL1_max or decreases to the lower limit value VOL1_min, the display device 1000 sends the second control command CM2 to the host device 2000 to adjust the second output volume value VOL2.

Figure 2A:
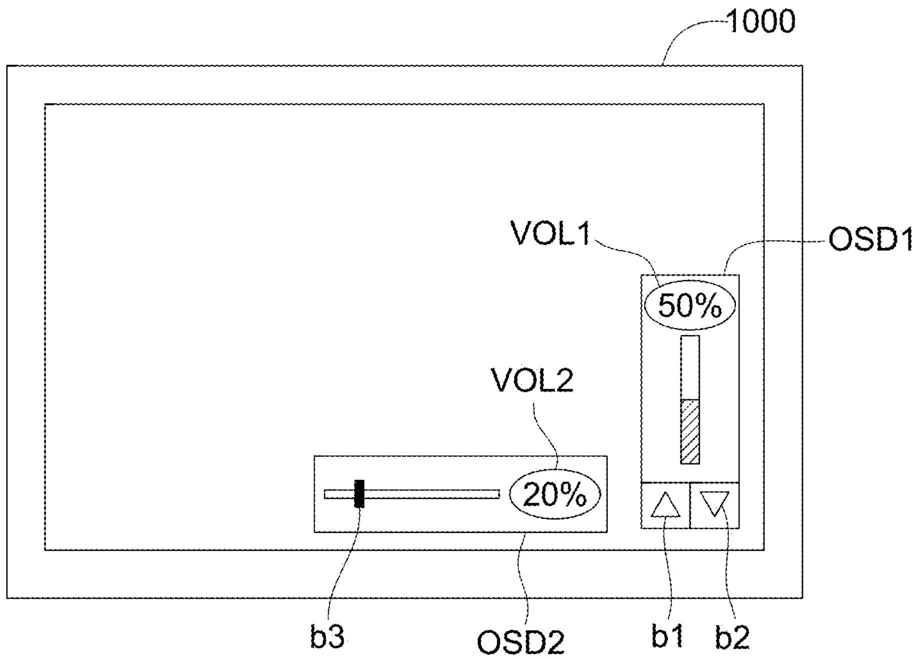
FIGS. 2A to 2C are schematic diagrams illustrating the user adjusts the first output volume value VOL1 and the second output volume value VOL2 through the display device 1000 of FIG. 1.
Figure 2B:
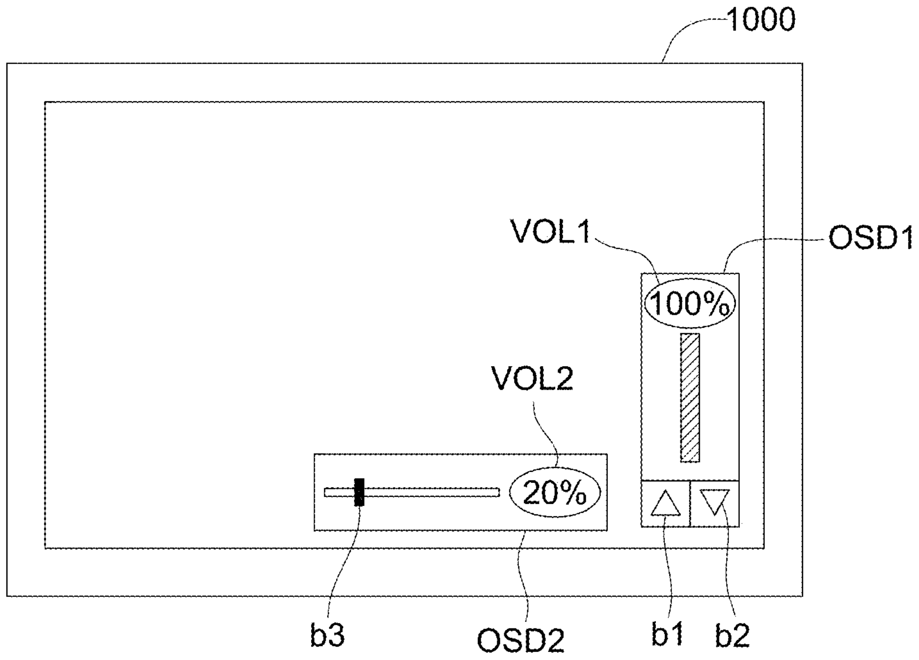
Figure 2C:
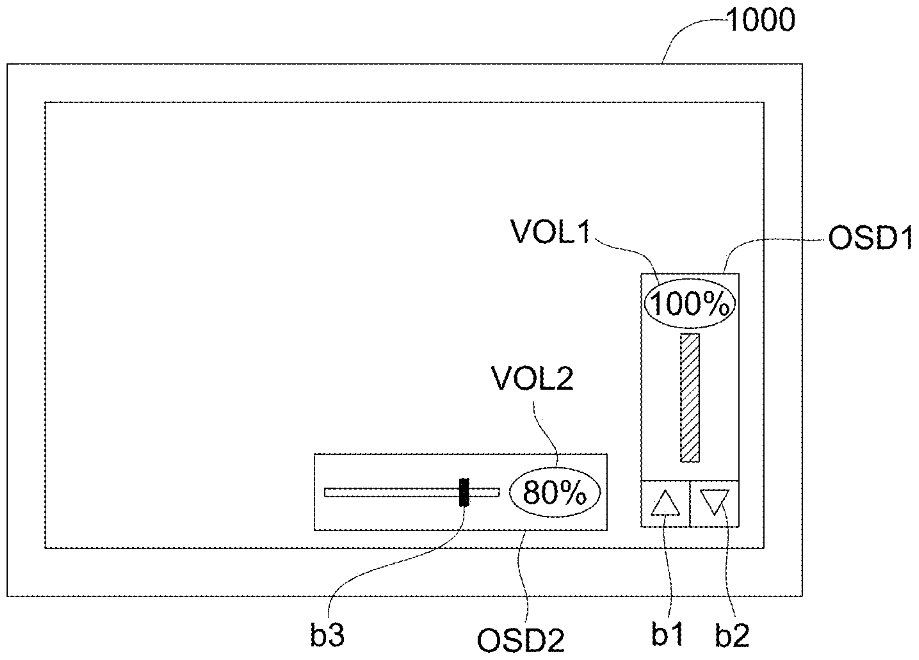

FIGS. 2A to 2C are schematic diagrams illustrating the user adjusts the first output volume value VOL1 and the second output volume value VOL2 through the display device 1000 of FIG. 1. Firstly, please refer to FIG. 2A, the display device 1000 may display an on-screen display (OSD) menu OSD1 for the user to adjust the first output volume value VOL1. For example, the user may press a graphical button b1 of the on-screen display menu OSD1 through the mouse cursor to increase the first output volume value VOL1, or press another graphical button b2 to decrease the first output volume value VOL1. In response to the pressing of graphic buttons b1 and b2, the on-screen display menu OSD1 may correspondingly display a current value of the first output volume value VOL1 (for example, 50%).

On the other hand, the display device 1000 may display another on-screen display menu OSD2 for the user to adjust the second output volume value VOL2. In another example, the second output volume value VOL2 may also be adjusted through a volume adjustment menu (not shown in the figures) in a system configuration window of an operating platform of the host device 2000. The user may drag a graphical lever b3 of the on-screen display menu OSD2 with the mouse cursor to increase or decrease the second output volume value VOL2, and the on-screen display menu OSD2 may correspondingly display a current value of the second output volume value VOL2 (for example, 20%).

In this embodiment, the volume value VOL0 of the first audio AUD0 is equal to the product of the first output volume value VOL1 and the second output volume value VOL2. When the user adjusts the first output volume value VOL1 as 50% and adjusts the second output volume value VOL2 as 20%, the volume value VOL0 of the first audio AUD0 is 10%.

In another example, the user may also adjust the third output volume value VOL3 (not shown in the figures) through an application program executed in the host device 2000. For example, a streaming media playback program executed in the host device 2000 also has a volume adjustment menu to adjust the third output volume value VOL3. In this case, the volume value VOL0 of the first audio AUD0 is equal to a product of the first output volume value VOL1, the second output volume value VOL2 and the third output volume value VOL3.

Next, please refer to the embodiment of FIG. 2B. When the user experiences that the volume value VOL0 of the first audio AUD0 is not large enough, the user may press the graphical button b1 of the on-screen display menu OSD1 through the mouse cursor to increase the first output volume VOL1, so as to increase the volume value VOL0 of the first audio AUD0, until the first output volume value VOL1 increases to 100% (i.e., reaches the upper limit value VOL1_max=100%). However, even though the first output volume value VOL1 has increased to 100%, the current value of the second output volume value VOL2 is still 20%. Therefore, the volume value VOL0 of the first audio AUD0 only increases to 20%, and the volume value VOL0 still has a margin to be increased. When an internal control circuit of the display device 1000 determines that the first output volume value VOL1 has reached the upper limit value VOL1_max (i.e., 100%), and the user continues to press the graphic button b1 of the on-screen display menu OSD1 through the mouse cursor, the internal control circuit of display device 1000 may automatically transmit the second control command CM2 to the host device 2000, such that the host device 2000 increases the second output volume value VOL2. For example, in the embodiment of FIG. 2C, the host device 2000 increases the second output volume value VOL2 to 80% in response to the second control command CM2. Meanwhile, the volume value VOL0 of the first audio AUD0 may be increased to 80%.

In another embodiment (not shown in FIGS. 2A to 2C), when the user experiences that the volume value VOL0 of the first audio AUD0 is not small enough, the user may press the graphic button b2 on the on-screen display menu OSD1 through the mouse cursor to decrease the first output volume value VOL1, thereby decreasing the volume value VOL0 of the first audio AUD0, until the first output volume value VOL1 is reduced to 0% (i.e., reaching the lower limit value VOL1_max=0%). However, even though the first output volume value VOL1 has been reduced to 0%, the current value of the second output volume value VOL2 is still 20%. In subsequent operations, the second output volume value VOL2 may still be further decreased to 0%. When the internal control circuit of the display device 1000 determines that the first output volume value VOL1 has reached the lower limit value VOL1_min (i.e., 0%), and the user continues to press the graphic button b2 of the on-screen display menu OSD1 through the mouse cursor, the internal control circuit of the display device 1000 may automatically transmit the second control command CM2 to the host device 2000, so as to cause the host device 2000 to decrease the second output volume value VOL2.

In the above embodiments, when the first output volume value VOL1 has reached the upper limit value VOL1_max (i.e., 100%) or reached the lower limit value VOL1_min (i.e., 0%), the user does not need to actively increase or decrease the second output volume value VOL2 (i.e., the user does not need to actively increase or decrease the second output volume value VOL2 through the graphic lever b3 of the on-screen display menu OSD2), but the display device 1000 automatically transmits the second control command CM2 to cause the host device 2000 to increase or decrease the second output volume value VOL2. Therefore, with the help of the second control command CM2, the user only needs to operate the graphic button b1 or b2 of the on-screen display menu OSD1 to cause the host device 2000 to continuously increase or decrease the second output volume value VOL2, which may simplify the user's operation and greatly improve user's convenience.

Figure 3:
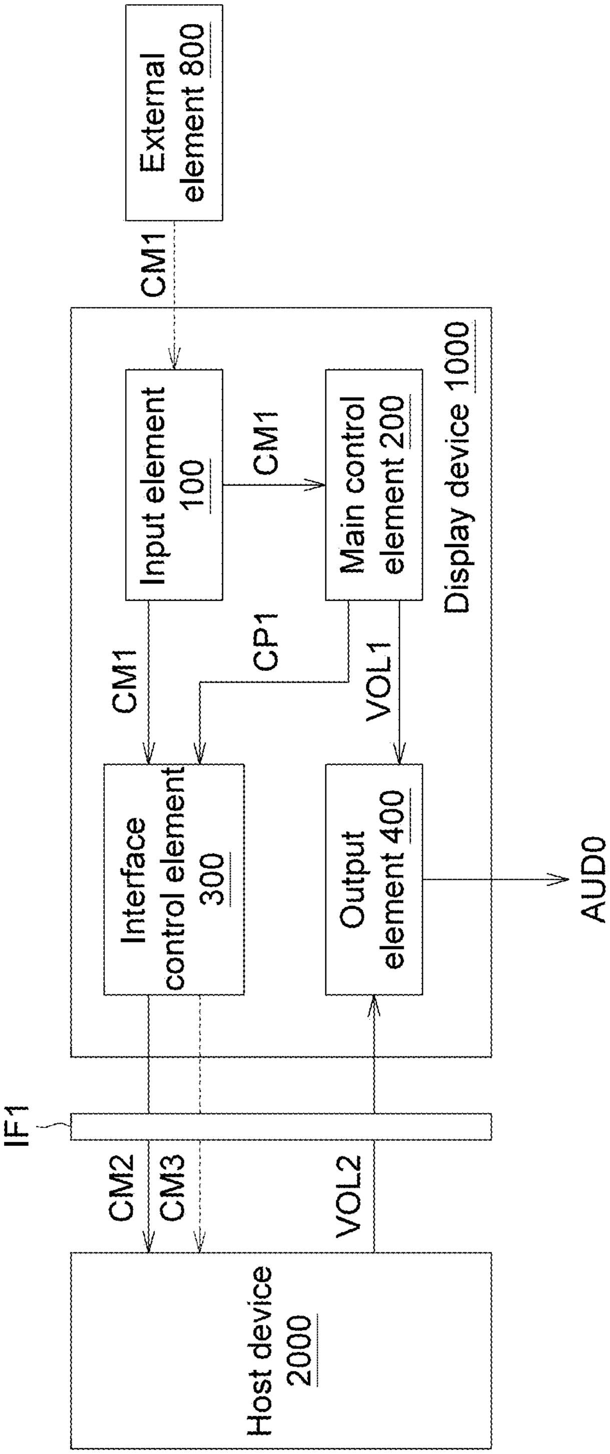
FIG. 3 is a functional block diagram of the display device 1000 of FIG. 1.

Next, please refer to FIG. 3, which is a functional block diagram of the display device 1000 of FIG. 1. The display device 1000 includes an input element 100, a main control element 200, an interface control element 300 and an output element 400. Each of the input element 100, the main control element 200, the interface control element 300 and the output element 400 may be a separate hardware circuit or a microprocessor in the display device 1000. Alternatively, the input element 100, the main control element 200, the interface control element 300 and the output element 400 may be implemented by a central processor or signal processor in the display device 1000. The interface control element 300 and the output element 400 are coupled to the host device 2000 through the first interface IF1. Furthermore, the display device 1000 is selectively coupled to an external element 800.

The input element 100 is associated with the on-screen display menu OSD1, and the user may operate the on-screen display menu OSD1 through the input element 100. Alternatively, the input element 100 may control the on-screen display menu OSD1. The input element 100 cooperates with the on-screen display menu OSD1 to convert the user's operation behavior of increasing or decreasing the first output volume value VOL1 as a specific first control command CM1. In one example, the frame or back plate of the display device 1000 is provided with physical buttons, and the input element 100 is the physical buttons corresponding to the display device 1000.

In another example, the input element 100 is a wired or wireless receiver that is communicatively coupled to the external element 800. The user generates the first control command CM1 through the external element 800, and the input element 100 receives the first control command CM1 from the external element 800. The external element 800 is, for example, an on-screen display menu remote controller, which operates the on-screen display menu OSD1 in a wireless manner. Alternatively, the external element 800 is physical button(s) of the external headphone 3030 in FIG. 1, and the first control command CM1 for increasing or decreasing the first output volume value VOL1 may be generated through the physical button(s) of the external headphone 3030.

The main control element 200 is coupled to the input element 100 to receive the first control command CM1, and the main control element 200 generates the first output volume value VOL1 according to the first control command CM1. The main control element 200 includes, e.g., a parser circuit that may parse whether to increase or decrease the first output volume value VOL1 from the first control command CM1, and adjust the first output volume value VOL1 according to the first control command CM1. On the other hand, the main control element 200 may include a comparator circuit for comparing the first output volume value VOL1 with the upper limit value VOL1_max to generate a first comparison result CP1.

The output element 400 is coupled to the main control element 200 to receive the first output volume value VOL1, and coupled to the host device 2000 through the first interface IF1 to receive the second output volume value VOL2. The output element 400 includes, e.g., a multiplier circuit for performing a multiplication operation of the first output volume value VOL1 and the second output volume value VOL2, so as to generate the volume value VOL0 of the first audio AUD0.

Furthermore, the output element 400 is coupled to the external speaker 3010, the built-in speaker 3020 or the external headphone 3030 in FIG. 1, so as to transmit the first audio AUD0 to the external speaker 3010, the built-in speaker 3020 or the external headphone 3030. The output element 400 includes, e.g., an audio driving circuit for driving the external speaker 3010, the built-in speaker 3020 or the external headphone 3030 to generate sound according to the first audio AUD0.

The interface control element 300 is coupled to the main control element 200 to receive the first comparison result CP1 and the first control command CM1, and generate the second control command CM2 according to the first comparison result CP1 and the first control command CM1. The interface control element 300 includes, e.g., a parser circuit for parsing the first comparison result CP1 and the first control command CM1. When the interface control element 300 parses the first comparison result CP1 to indicate that the first output volume value VOL1 has reached the upper limit value VOL1_max (i.e. 100%) and the first control command CM1 indicates that the user wants to continue to increase the first output volume value VOL1, the interface control element 300 generates a second control command CM2 correspondingly, and the second control command CM2 indicates increasing the second output volume value VOL2.

On the other hand, when the interface control element 300 parses the first comparison result CP1 to indicate that the first output volume value VOL1 has reached the lower limit value VOL1_min (i.e., 0%), and the first control command CM1 indicates that the user wants to continue to decrease When the first output volume value VOL1, the interface control element 300 correspondingly generates the second control command CM2. The second control command CM2 indicates to decrease the second output volume value VOL2.

The interface control element 300 is coupled to the host device 2000 through the first interface IF1, so as to transmit the second control command CM2 to the host device 2000. The host device 2000 increases or decreases the second output volume value VOL2 according to the second control command CM2. Furthermore, the host device 2000 transmits the second output volume value VOL2 to the output element 400 of the display device 1000 via the first interface IF1.

As mentioned above, the first interface IF1 is, e.g., an HDMI, a USB interface or a DP interface. When the first interface IF1 is an HDMI, the second control command CM2 is a Consumer Electronics Control (CEC) command specified by the HDMI specification. The CEC command of the HDMI may indicate "increasing the second output volume value VOL2" or "decreasing the second output volume value VOL2". On the other hand, when the first interface IF1 is a USB interface, the second control command CM2 is a HID volume increase command (e.g., coded as DB "0x09, 0xE9") or a HID volume decrease command (e.g. encoded as DB "0x09,0xEA") which is specified by the USB specification.

More specifically, if the first interface IF1 is an HDMI, after the display device 1000 is coupled to the host device 2000, the interface control element 300 establishes a connection between the display device 1000 and the host device 2000. According to the established connection, the display device 1000 and the host device 2000 may cooperate through the first interface IF1, including: transmitting the second control command CM2 and the second output volume value VOL2 through the first interface IF1.

On the other hand, if the first interface IF1 is a USB interface, after the display device 1000 is coupled to the host device 2000, the interface control element 300 firstly executes a device identification mechanism under the USB specification. In the device identification mechanism, the interface control element 300 firstly sends a third control command CM3 to the host device 2000. The third control command CM3 includes a HID device identification code under the USB specification, such as an identification code of USB keyboard device. According to the third control command CM3, the host device 2000 identifies the display device 1000 as a USB keyboard device (i.e., a keyboard device that communicates with the host device 2000 through a USB interface). In one example, the display device 1000 is identified as a USB keyboard device with a volume adjustment function, and the user may adjust the first output volume value VOL1 through physical button(s) of such a keyboard device. After the device identification mechanism under USB specification is executed, the interface control element 300 completes the establishment of the connection between the display device 1000 and the host device 2000.

Figure 4A:
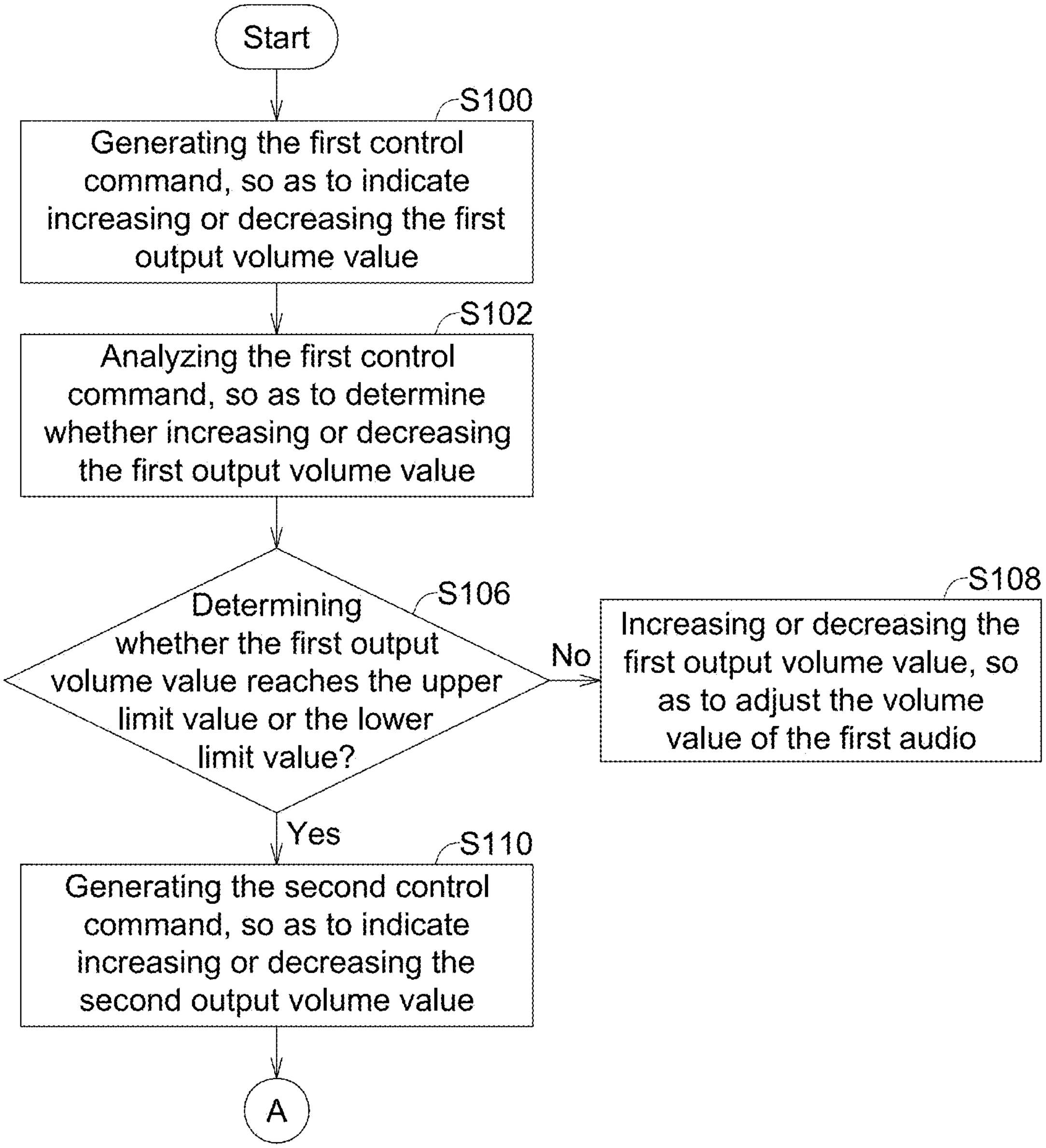
FIGS. 4A and 4B are flow diagrams illustrating an audio control method according to an embodiment of the present disclosure.
Figure 4B:
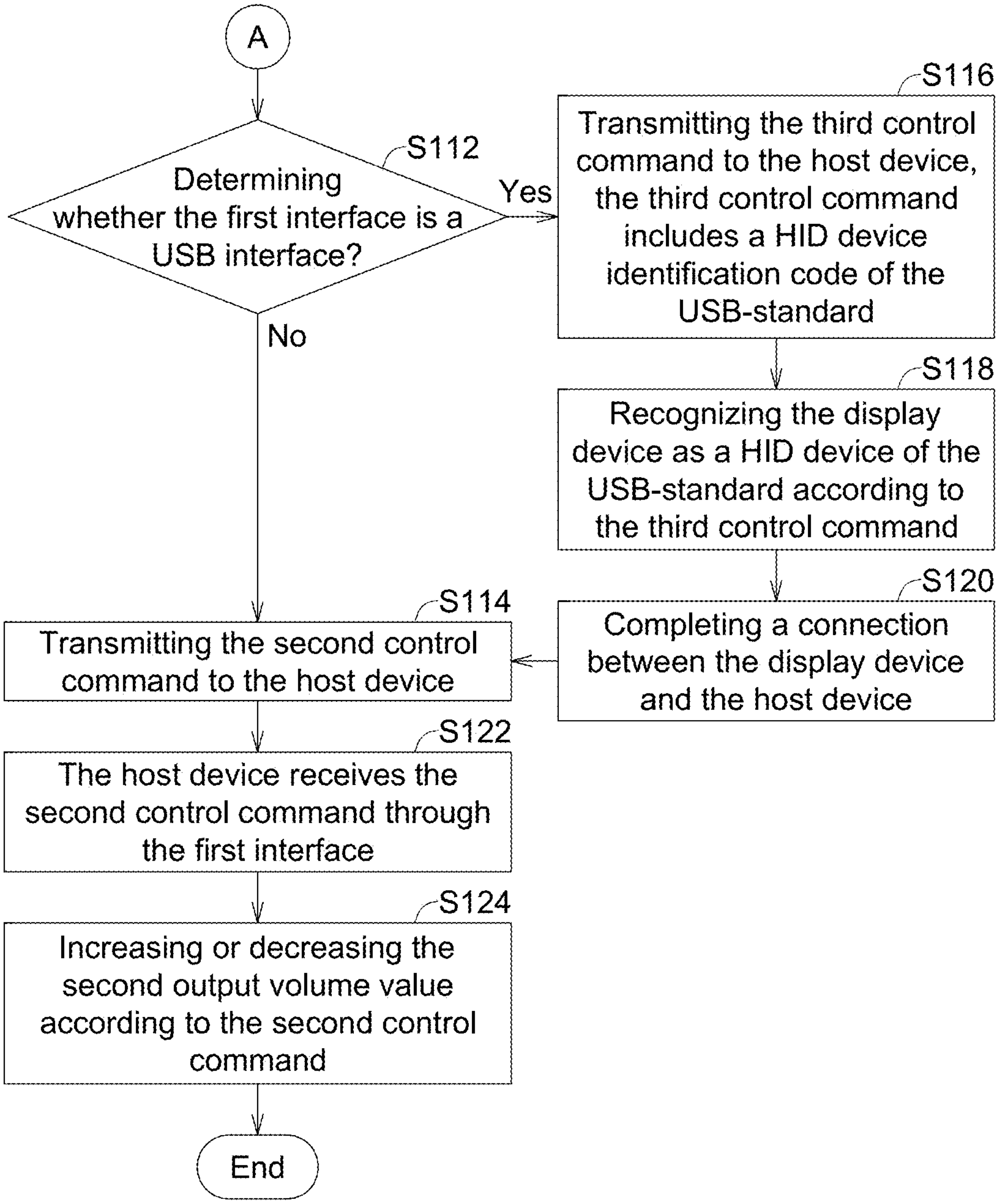

FIGS. 4A and 4B are flow diagrams illustrating an audio control method according to an embodiment of the present disclosure. The audio control method of this embodiment is used to control the first audio AUD0 provided by the display device 1000. Please refer to FIGS. 4A and 4B (also referring to FIG. 3 in conjunction), firstly, in step S100, the first control command CM1 is generated by the input element 100 of the display device 1000, and the first output volume value VOL1 is generated through the main control element 200 according to the first control command CM1. The first control command CM1 indicates increasing or decreasing the first output volume value VOL1.

Then, in step S102, the first control command CM1 is analyzed by the main control element 200, so as to determine whether the user wants to increase or decrease the first output volume value VOL1.

Then, step S106 is executed: the first output volume value VOL1 is compared with the upper limit value VOL1_max or the lower limit value VOL1_min by the main control element 200, so as to generate a first comparison result CP1. For example, when the first control command CM1 is parsed as increasing the first output volume value VOL1, the main control element 200 compares the first output volume value VOL1 with the upper limit value VOL1_max. On the other hand, when the first control command CM1 is parsed as decreasing the first output volume value VOL1, the main control element 200 compares the first output volume value VOL1 with the lower limit value VOL1_min. The first comparison result CP1 may indicate whether the first output volume value VOL1 reaches the upper limit value VOL1_max or the lower limit value VOL1_min.

If the determination result of step S106 is "no", it means that the first output volume value VOL1 has not reached the upper limit value VOL1_max and has not reached the lower limit value VOL1_min (i.e., the first output volume value VOL1 is between the upper limit value VOL1_max and between the lower limit value VOL1_min), then step S108 is executed: increasing or decreasing the first output volume value VOL1 by the main control element 200, and the output element 400 adjusts (i.e., increases or decreases) the volume value VOL0 of the first audio AUD0 based on the first output volume value VOL1.

If the determination result of step S106 is "yes" (i.e., the first output volume value VOL1 has reached the upper limit value VOL1_max, or has reached the lower limit value VOL1_min), then step S110 is executed: the second control command CM2 is generated by the interface control element 300, where the second control command CM2 indicates increasing or decreasing the second output volume value VOL2.

After step S110, step S112 is then executed: the type of the first interface IF1 is analyzed by the interface control element 300, so as to determine whether the first interface IF1 is a USB interface. If the determination result of step S112 is "no" (i.e., the first interface IF1 is not a USB interface), step S114 is executed: the second control command CM2 is sent to the host device 2000. The second control command CM2 is, e.g., a CEC command of the HDMI specification, indicating to increase or decrease the second output volume value VOL2.

Then, in step S122, the host device 2000 receives the second control command CM2 through the first interface IF1. Then, in step S124, the host device 2000 increases or decreases the second output volume value VOL2 according to the second control command CM2, and the output element 400 adjusts the volume value VOL0 of the first audio AUD0 according to the second output volume value VOL2.

If the determination result of step S112 is "yes" (i.e., the first interface IF1 is a USB interface), then step S116 is executed: the interface control element 300 sends a third control command CM3 to the host device 2000. The third control command CM3 Includes a HID device identification code under the USB specification (e.g., a device identification code of a USB keyboard).

After step S116, step S118 is then executed: the host device 2000 identified the display device 1000 as a HID device of the USB specification according to the third control command CM3. Then, step S120 is executed: the interface control element 300 completes the establishment of the connection between the display device 1000 and the host device 2000. Then, returning to step S114: the second control command CM2 is sent to the host device 2000. The second control command CM2 is, e.g., a HID volume increase command under the USB specification (e.g., encoded as DB "0x09, 0xE9"), indicating that the second output volume value VOL2 is increased. Alternatively, the second control command CM2 is a HID volume decrease command (e.g., encoded as DB "0x09, 0xEA"), indicating that the second output volume value VOL2 is decreased.

According to the audio control method illustrated in FIGS. 4A and 4B, when the first output volume value VOL1 has reached the upper limit value VOL1_max (i.e., 100%), if the user still wants to increase the volume value VOL0 of the first audio AUD0, the display device 1000 automatically transmits the second control command CM2 to cause the host device 2000 to increase the second output volume value VOL2. Alternatively, when the first output volume value VOL1 has reached the lower limit value VOL1_min (i.e., 0%), if the user still wants to decrease the volume value VOL0 of the first audio AUD0, the display device 1000 automatically sends the second control command CM2 to cause the host device 2000 to decrease the second output volume value VOL2. Accordingly, an automatic mechanism is utilized to cause the host device 2000 to increase or decrease the second output volume value VOL2 by the second control command CM2, which may simplify the behaviors of user's manual operation.

It will be apparent to those skilled in the art that various modifications and variations may be made to the disclosed embodiments. It is intended that the specification and examples be considered as exemplars only, with a true scope of the disclosure being indicated by the following claims and their equivalents.

What is claimed is:

1. A display device, capable of providing a first audio, is coupled to a host device through a first interface, the display device has a first output volume value, and the host device has a second output volume value, the display device comprising:

a main control element, used to adjust the first output volume value according to a first control command, and compare the first output volume value with an upper limit value or a lower limit value to generate a first comparison result;

an output element, coupled to the main control element and the host device, and used to generate the first audio according to the first output volume value and the second output volume value; and an interface control element, coupled to the main control element and an input element, coupled to the host device through the first interface, and used to selectively generate a second control command according to the first comparison result and the first control command, wherein, when the first control command indicates increasing the first output volume value and the first comparison result indicates that the first output volume value is equal to the upper limit value, or when the first control command indicates decreasing the first output volume value and the first comparison result indicates that the first output volume value is equal to the lower limit value, the interface control element generates the second control command and sends the second control command to the host device through the first interface, and the host device adjusts the second output volume value in response to the second control command.

2. The display device according to claim 1, wherein a volume value of the first audio is proportional to a product of the first output volume value and the second output volume value.

3. The display device according to claim 1, wherein the first interface is a Universal Serial Bus (USB) interface, a High Definition Multimedia Interface (HDMI) or a Display Port (DP) interface.

4. The display device according to claim 3, wherein when the first interface is the HDMI, the second control command is a Consumer Electronics Control (CEC) command specified by a specification of the HDMI.

5. The display device according to claim 3, wherein when the first interface is the USB interface, the interface control element further sends a third control command to the host device, and the host device identifies the display device as a Human Interface Device (HID) specified by a specification of the USB interface according to the third control command.

6. The display device according to claim 5, wherein the HID is a keyboard device, and the keyboard device has a function of adjusting the first output volume value.

7. The display device according to claim 5, wherein the second control command is a HID volume increase command or a HID volume decrease command specified by a specification of the USB Interface.

8. The display device according to claim 1, wherein:

when the first control command indicates increasing the first output volume value and the first comparison result indicates that the first output volume value is less than the upper limit value, the display device increases the first output volume value in response to the first control command; and when the first control command indicates decreasing the first output volume value and the first comparison result indicates that the first output volume value is greater than the lower limit value, the display device decreases the first output volume value in response to the first control command.

9. The display device according to claim 1, wherein when the first control command indicates decreasing the first output volume value, the display device decreases the first output volume value in response to the first control command.

10. The display device according to claim 1, wherein the input element is associated with an on-screen display (OSD) menu of the display device and used to generate the first control command.

11. The display device according to claim 10, wherein the input element is a physical button corresponding to the display device, or the input element is communicatively coupled to an OSD menu remote controller or an external headphone.

12. An audio control method, for controlling a first audio provided by a display device, wherein the display device is coupled to a host device through a first interface, the display device has a first output volume value, and the host device has a second output volume value, and the audio control method comprising the following steps:

adjusting the first output volume value according to a first control command;

generating the first audio according to the first output volume value and the second output volume value;

comparing the first output volume value with an upper limit value or a lower limit value to generate a first comparison result; and selectively generating a second control command according to the first comparison result and the first control command, wherein, when the first control command indicates increasing the first output volume value and the first comparison result indicates that the first output volume value is equal to the upper limit value, or when the first control command indicates decreasing the first output volume value and the first comparison result indicates that the first output volume value is equal to the lower limit value, performing the following steps:

generating the second control command;

sending the second control command to the host device through the first interface; and adjusting the second output volume value by the host device in response to the second control command.

13. The audio control method according to claim 12, wherein a volume value of the first audio is proportional to a product of the first output volume value and the second output volume value.

14. The audio control method according to claim 12, wherein the first interface is a Universal Serial Bus (USB) interface, a High Definition Multimedia Interface (HDMI) or a Display Port (DP) interface.

15. The audio control method according to claim 14, wherein when the first interface is the HDMI, the second control command is a Consumer Electronics Control (CEC) command specified by a specification of the HDMI.

16. The audio control method according to claim 14, wherein when the first interface is the USB interface, the audio control method further comprising the following steps:

sending a third control command to the host device through the first interface; and identifying the display device as a Human Interface Device (HID) specified by a specification of the USB interface according to the third control command, by the host device.

17. The audio control method according to claim 16, wherein the HID is a keyboard device, and the keyboard device has a function of adjusting the first output volume value.

18. The audio control method according to claim 16, wherein the second control command is a HID volume increase command or a HID volume decrease command specified by a specification of the USB Interface.

19. The audio control method according to claim 12, wherein:

when the first control command indicates increasing the first output volume value and the first comparison result indicates that the first output volume value is less than the upper limit value, the audio control method comprises: increasing the first output volume value by the display device in response to the first control command; and when the first control command indicates decreasing the first output volume value and the first comparison result indicates that the first output volume value is greater than the lower limit value, the audio control method comprises: decreasing the first output volume value by the display device in response to the first control command.

20. The audio control method according to claim 12, wherein when the first control command indicates decreasing the first output volume value, the audio control method comprising the following steps:

decreasing the first output volume value by the display device in response to the first control command.

21. The audio control method according to claim 12, wherein before the step of adjusting the first output volume value according to the first control command, the audio control method further comprising:

generating the first control command by an input element;

wherein, the input element is associated with an on-screen display (OSD) menu of the display device.

22. The audio control method according to claim 21, wherein the input element is a physical button corresponding to the display device, or the input element is communicatively coupled to an OSD menu remote controller or an external headphone.

* * * * *